United States Patent [19]

Shen et al.

[11] 3,912,769

[45] Oct. 14, 1975

[54] N-(4-SULFANILYLPHENYL) PHOSPHORIC ACID TRIAMIDES

[75] Inventors: Tsung-Ying Shen, Westfield; Norman P. Jensen, Watchung, both of N.J.

[73] Assignee: Merck & Co., Inc., Rahway, N.J.

[22] Filed: Dec. 13, 1973

[21] Appl. No.: 424,523

Related U.S. Application Data

[63] Continuation-in-part of Ser. No. 284,788, Aug. 30, 1972, abandoned.

[52] U.S. Cl. ........ 260/397.6; 260/239.6; 260/239.8; 260/239.9; 424/200; 424/202; 424/203; 424/209; 424/211
[51] Int. Cl.² ........................................ C07C 147/12
[58] Field of Search ........... 260/397.6, 239.6, 239.8, 260/239.9

[56] References Cited
UNITED STATES PATENTS
2,287,154   6/1942   Warnat ............................ 260/397.6

OTHER PUBLICATIONS

C.A. 51 : 5620c (1957) Goehring et al.

Chem. Ber. 89 : 1768–1771 (1956) Goehring et al.

*Primary Examiner*—Sherman D. Winters
*Attorney, Agent, or Firm*—William H. Nicholson; Harry E. Westlake, Jr.

[57] ABSTRACT

N-(4-sulfanilylphenyl)phosphoric acid triamides are described which have utility as antiinflammatory, antipyretic and analgesic agents. They are prepared by treatment of 4-amino-4'-nitrodiphenylsulfone with phosphorus oxychloride followed by treatment of the resulting phosphoramidic dichloride with ammonia or amines and reduction of the nitro group. Various acyl and Schiff base derivatives of the sulfanilyl nitrogen having similar utility are also described.

6 Claims, No Drawings

N-(4-SULFANILYLPHENYL) PHOSPHORIC ACID TRIAMIDES

This application is a continuation-in-part of copending application Ser. No. 284,788, filed Aug. 30, 1972 now abandoned.

This invention is concerned with N-(4-sulfanilylphenyl)phosphoric acid triamides, processes for their preparation and their use in the treatment of inflammatory disease entities.

The novel compounds of this invention have structural formula I:

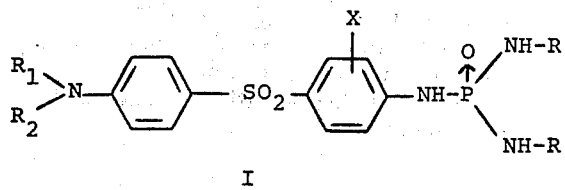

I wherein
X is hydrogen or fluoro;
R is
a. hydrogen,
b. $C_{1-5}$-lower alkyl, either straight or branched chain and either unsubstituted or substituted with phenyl, halophenyl, $C_{1-5}$ lower alkylphenyl, $C_{1-3}$ lower alkoxyphenyl, or di($C_{1-3}$ lower alkyl) amino,
c. $C_{3-7}$ lower cycloalkyl,
d. phenyl,
e. halophenyl,
f. $C_{1-5}$ lower alkylphenyl,
g. $C_{1-3}$ lower alkoxyphenyl,
h. $C_{1-3}$ lower alkoxycarbonyl-$C_{1-3}$-alkyl,
i. adamantyl;
or the two R groups taken together represent:
a. ortho-phenylene either unsubstituted or substituted with halo, $C_{1-5}$ lower alkyl, or $C_{1-3}$ lower alkoxy,
b. $C_{2-3}$ lower hydrocarbon bridge either unsubstituted or substituted with a $C_{1-3}$ lower alkyl;
$R_1$ is hydrogen;
$R_2$ is hydrogen or

wherein $R_3$ represents
a. $C_{1-3}$ lower alkyl, either straight or branched chain, and either unsubstituted or substituted with
1. halo, such as chloro or fluoro,
2. amino, dichloride in
3. phenyl, or
4. carboxy,
b. $C_{4-6}$ lower cycloalkyl,
c. a 5-6 membered heterocycle wherein the hetero atom is oxygen or nitrogen, such as furyl, pyridyl, imidazolyl, or imidazolidinyl; or $R_1$ and $R_2$ taken together is $R_4$-CH=, wherein $R_4$ is
a. di($C_{1-3}$ loweralkyl)amino,
b. styryl,
c. phenyl, either unsubstituted or substituted with
1. halo, such as chloro, or fluoro,
2. hydroxy,
3. $C_{1-3}$ lower alkoxy,
4. ortho-methylenedioxy,

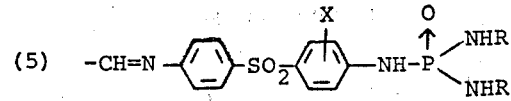

wherein X and R are as defined above, or
d. a 5-6 membered heterocycle wherein the hetero atom is oxygen, nitrogen, or sulfur such as thienyl, imidazolyl, pyridyl, or pyranyl.

In the more preferred aspects of this invention $R_1$ and $R_2$ are hydrogen.

Another embodiment of this invention is the compound of formula:

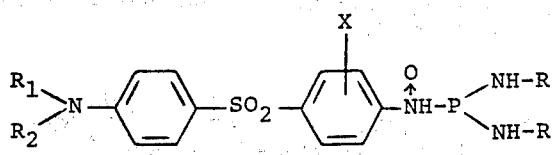

wherein
X is hydrogen or fluoro;
R is
a. lower alkyl,
b. phenyl-lower alkyl,
c. halophenyl-lower alkyl,
d. lower alkylphenyl-lower alkyl,
e. lower alkoxyphenyl-lower alkyl,
f. lower cycloalkyl,
g. phenyl,
h. halophenyl,
i. lower alkylphenyl,
j. lower alkoxyphenyl,
k. lower alkoxycarbonyl-lower alkyl,
l. di(lower alkyl)amino-lower alkyl,
m. adamantyl; or the
two R groups taken together form:
a. ortho-phenylene,
b. halo-ortho-phenylene,
c. lower alkyl-ortho-phenylene,
d. lower alkoxy-ortho-phenylene,
e. lower hydrocarbon bridge,
f. lower hydrocarbon bridge substituted with lower alkyl;
$R_1$ is hydrogen;
$R_2$ is hydrogen or

wherein $R_3$ is
a. lower alkyl,
b. halo-lower alkyl,
c. amino-lower alkyl,
d. phenyl-lower alkyl,
e. carboxy-lower alkyl,
f. lower cycloalkyl,
g. a 5–6 membered heterocycle wherein the hetero atom is oxygen or nitrogen; or $R_1$ and $R_2$ taken together is $R_4$—CH=, wherein $R_4$ is
a. di(lower alkyl)amino,
b. styryl, c. phenyl,
d. halophenyl,
e. hydroxyphenyl,
f. lower alkoxyphenyl,
g. α-methylenedioxyphenyl, (h) 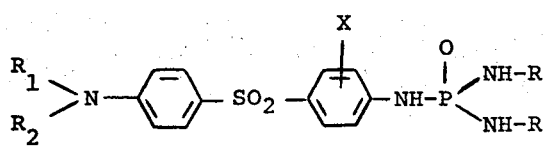

wherein X and R are as defined above, or
i. a 5–6 membered heterocycle wherein the hetero atom is oxygen, nitrogen, or sulfur.

In the more preferred aspects of the above embodiment, $R_1$ and $R_2$ are both hydrogen.

Another embodiment of this invention is the compound of formula:

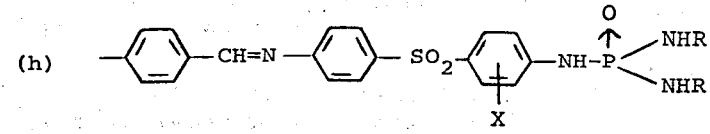

wherein
X is hydrogen or fluoro;
R is
a. lower alkyl,
b. phenyl-lower alkyl,
c. halophenyl-lower alkyl,
d. lower alkylphenyl-lower alkyl,
e. lower alkoxyphenyl-lower alkyl,
f. lower cycloalkyl,
g. phenyl
h. halophenyl,
i. lower alkylphenyl,
j. lower alkoxyphenyl,
k. lower alkoxycarbonyl-lower alkyl,
l. di(lower alkyl)amino-lower alkyl,
m. adamantyl;
$R_1$ is hydrogen;
$R_2$ is hydrogen or

wherein $R_3$ is
a. lower alkyl,
b. halo-lower alkyl,
c. amino-lower alkyl,
d. phenyl-lower alkyl,
e. carboxy-lower alkyl,
f. lower cycloalkyl,
g. a 5–6 membered heterocycle wherein the hetero atom is oxygen or nitrogen; or $R_1$ and $R_2$ taken together is $R_4$—CH=, wherein $R_4$ is
a. di(lower alkyl)amino,
b. styryl,
c. phenyl,
d. halophenyl,
e. hydroxyphenyl,
f. lower alkoxyphenyl,
g. α-methylenedioxyphenyl, (h) 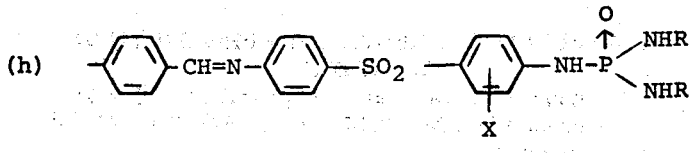

wherein X and R are as defined above, or
i. a 5–6 membered heterocycle wherein the hetero atom is oxygen, nitrogen, or sulfur.

In the more preferred aspects of the above embodiment, $R_1$ and $R_2$ are both hydrogen.

A further embodiment of this invention is the compound of formula:

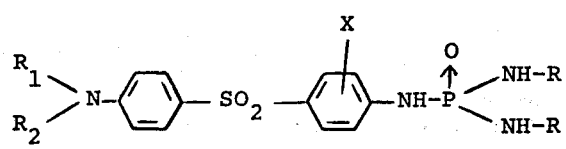

wherein
X is hydrogen or fluoro;
the two R groups taken together form:

a. ortho-phenylene,
b. halo-ortho-phenylene,
c. lower alkyl-ortho-phenylene,
d. lower alkoxy-ortho-phenylene,
e. lower hydrocarbon bridge,
f. lower hydrocarbon bridge substituted with lower alkyl;
$R_1$ is hydrogen;
$R_2$ is hydrogen or

wherein $R_3$ is
a. lower alkyl,
b. halo-lower alkyl,
c. amino-lower alkyl,
d. phenyl-lower alkyl,
e. carboxy-lower alkyl,
f. lower cycloalkyl,
g. a 5–6 membered heterocycle wherein the hetero atom is oxygen or nitrogen; or $R_1$ and $R_2$ taken together is $R_4$—CH=, wherein $R_4$ is
a. di(lower alkyl)amino,
b. styryl,
c. phenyl,
d. halophenyl,
e. hydroxyphenyl,
f. lower alkoxyphenyl,
g. α-methylenedioxyphenyl,

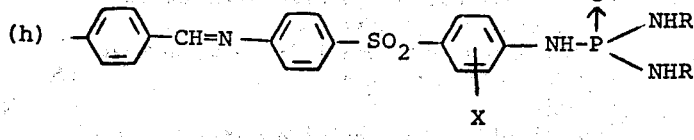

wherein X and R are as defined above, or
i. a 5–6 membered heterocycle wherein the hetero atom is oxygen, nitrogen, or sulfur.

In the more preferred aspects of the above embodiment, $R_1$ and $R_2$ are both hydrogen.

The novel compounds of this invention are prepared according to the following reaction scheme and discussion thereof:

Step (a)

Compound II is readily converted to Compound III by treating it with phosphorus oxychloride. A molar equivalent of phosphorus oxychloride is stoichiometrically required but any amount in excess thereof may be

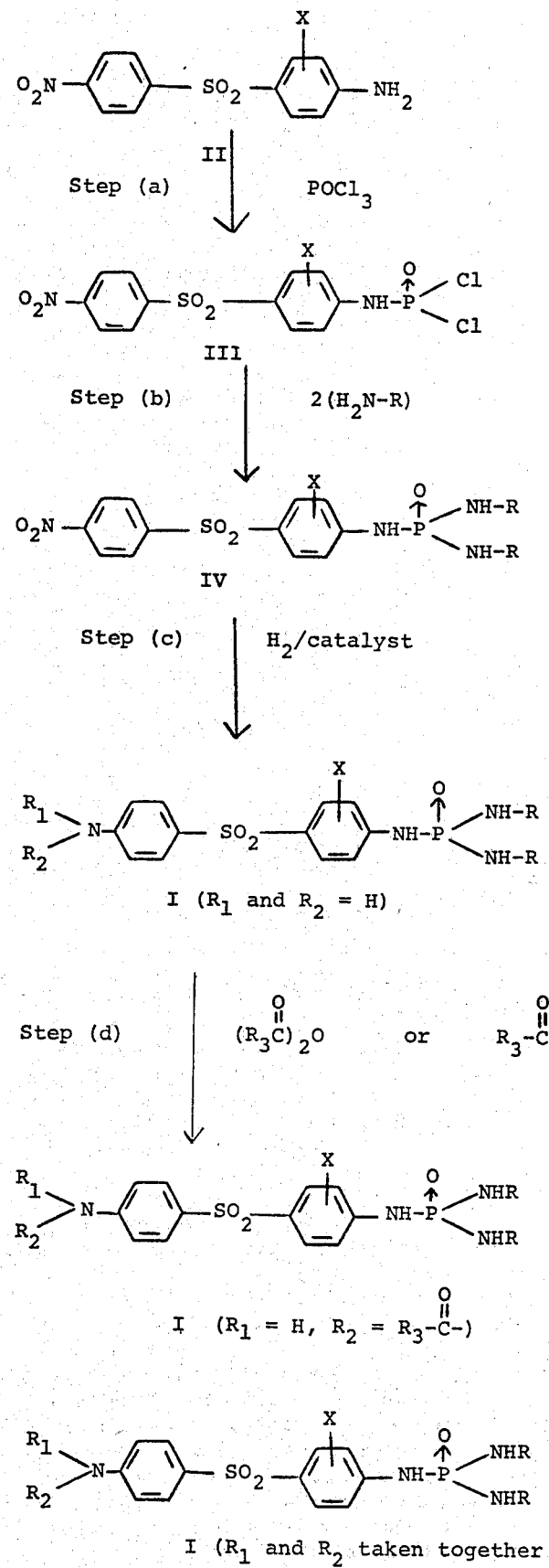

employed and in fact large excesses are conveniently employed to serve as the liquid phase for the reaction mixture. Otherwise, with lesser amounts of phosphorus oxychloride, an inert organic solvent may be employed. The temperature of the reaction is not critical and may be any temperature between about room temperature and the reflux temperature of the reaction mixture. Reflux temperature is preferred to provide a reasonable reaction rate. In the preferred mode, refluxing excess phosphorus oxychloride, the product precipitates from the cooled mixture and is collected.

Step (b)

Compound IV is prepared by treating Compound III with an appropriate amine or ammonia. Two molar equivalents of the amine are stoichiometrically required however the reaction is facilitated by having present sufficient acid acceptor to consume the hydrochloric acid liberated by the condensation and for this purpose at least two additional molar equivalents to the amine are commonly employed. The reaction is normally conducted in an inert organic solvent such as dioxane, 1,2-dimethoxyethane, diethylene glycol, dimethylether or the like, preferably dioxane. Temperature is not critical. Elevated temperatures may be employed but the reaction proceeds rapidly at room temperature, and is the most convenient. Generally, the product precipitates from the mixture and is collected.

Step (c)

The novel compounds of this invention, having Structure I, ($R_1$ and $R_2$ = H), are prepared from Compound IV by reduction of the nitro group to the amino group. Any reductive system commonly employed in the art for this purpose may be employed that is not inimical to the integrity of the sulfone and the phosphoric group. One such system is catalytic hydrogenation, preferably with a Raney nickel catalyst in an inert solvent such as an alcohol, preferably ethanol. Initial hydrogen pressures from atmospheric to about 50 p.s.i. are satisfactory. The product is isolated by separating the catalyst, and evaporating the solvent.

Step (d)

Preparation of the compounds of this invention wherein $R_1$ is hydrogen and $R_2$ is

involves traditional N-acylation techniques. One such method related to the Schotten-Baumann reaction comprises vigorous agitation of a heterogeneous mixture of an acid chloride of formula $R_3$-C-Cl, the sulfanilyl compound and aqueous alkali such as sodium hydroxide solution. Temperature is not critical, but reaction rates are usually adequate at ambient temperature.

Alternatively, a homogeneous system comprising the acylating agent of formula

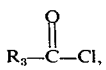

and the sulfanilyl compound in an organic base, such as pyridine, triethylamine, or the like, provides good results. In this case, the reaction proceeds satisfactorily at temperatures from ambient to about 100°C.

A third method comprises stirring a suspension of the sulfanilyl compound in an acid anhydride of formula $(R_3CO)_2O$. Generally, sufficient acid anhydride is used to act as solvent or reaction medium but other inert organic solvents may be employed as reaction medium. Periods of time from 3 hours to prolonged periods of about 15 hours are employed at temperatures from ambient to the reflux temperature of the particular solvent.

Step (e)

The compounds of this invention, wherein $R_1$ and $R_2$ taken together is $R_4$—CH=, are prepared by any well-known Schiff base preparatory scheme. It comprises mixing an aldehyde of formula $R_4$—CHO with a sulfanilyl compound in an inert organic solvent such as a lower alkanol, a di(lower alkyl) ketone or the like which preferably will dissolve the two reactants. By judicious choice of quantity of solvent, the less soluble Schiff base product will crystallize from solution. Alternatively, crystallization can be induced by concentration or cooling. The condensation proceeds at ambient temperature, but temperatures up to the boiling point of the solvent may be employed.

The compounds of this invention possess a high degree of antiinflammatory, analgesic and antipyretic activity. They are of value in the treatment of arthritic and dermatological disorders or like conditions responsive to antiinflammatory drugs. In general, they are indicated for a wide variety of conditions where one or more of the symptoms of inflammation, fever and pain are manifested. Included within this category are diseases such as rheumatoid arthritis, osteoarthritis, gout, infectious arthritis, rheumatic fever and inflammatory conditions of the ocular system. As indicated above, the compounds utilized in the practice of the invention also possess a useful degree of analgesic and antipyretic activity.

For these purposes the compounds of the invention may be administered orally, topically, parenterally, by inhalation spray or rectally in dosage unit formulations containing conventional non-toxic pharmaceutically acceptable carriers, adjuvants and vehicles. The term parenteral as used herein includes subcutaneous injections, intravenous, intramuscular, intrasternal injection or infusion techniques. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents, such as calcium carbonate, sodium carbonate, lactose, calcium phosphate or sodium phosphate; granulating and disintegrating agents, for example, maize starch, or alginic acid; binding agents, for example starch, gelatine or acacia; and lubricating agents, for example magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate may be employed.

Formulations for oral use may also be presented as hard gelatine capsules wherein the active ingredient is mixed with an inert solid diluent, for example, calcium carbonate, calcium phosphate or kaolin, or as soft gelatine capsules wherein the active ingredient is mixed with water or an oil medium, for example, peanut oil, liquid paraffin or olive oil.

Aqueous suspensions contain the active materials in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyoxyethylene sorbitan monooleate. The said aqueous suspensions may also contain one or more preservatives, for example ethyl, or n-propyl p-hydroxy benzoate, one or more coloring agents, one or more flavoring agents, and one or more sweetening agents, such as sucrose or saccharin.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent or one or more preservatives. Suitable dispersing or wetting agents and suspending agents are exemplified by those already mentioned above. Additional excipients, for example sweetening, flavoring and coloring agents, may also be present.

The pharmaceutical compoisitions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectibles.

The compounds of the invention may also be administered in the form of suppositories for rectal administration of the drug. These compositions can be prepared by mixing the drug with a suitable non-irritating excipient which is solid at oridnary temperatures but liquid at the rectal temperature and will therefore melt in the rectum to release the drug. Such materials are cocao butter and polyethylene glycols.

For topical use, creams, ointments, jellies, solutions or suspensions, etc., containing the anti-inflammatory agents are employed.

Dosage levels of the order of 12.5 mg. to 500 mg. per kilogram of body weight per day are useful in the treatment of the above indicated conditions (625 mg.–25 gm. per patient per day). Advantageously, from about 25 mg. to about 50 mg. per kilogram of body weight per daily dosage produces highly effective results (1.25 g. to 2.5 g. per patient per day).

The amount of active ingredient that may be combined with the carrier materials to produce a single dosage form will vary depending upon the host treated and the particular mode of administration. For example, a formulation intended for the oral administration to humans may contain from 5 mg. to 5 gm. of active agent compounded with an appropriate and convenient amount of carrier material which may vary from about 5 to about 95 percent of the total composition. Dosage unit forms will generally contain between from about 25 mg. to about 500 mg. of active ingredient.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

EXAMPLE 1

N-4-sulfanilylphenyl phosphoric acid triamide

Step A: Preparation of
4-(4-nitrophenylsulfonyl)phenylphosphoramidic
dichloride

A mixture of 200 g. of 4-amino-4'-nitrodiphenylsul-

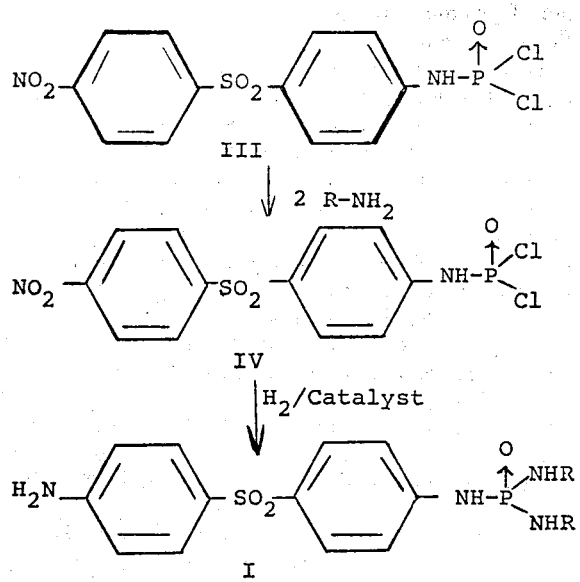

ane and ether and dried to give N-4-(4-nitrophenylsulfonyl)phenyl phosphoric acid triamide: 0.5 $H_2O$, m.p. 229°C. (dec.).

Calc. for $C_{12}H_{13}O_5N_4PS$. 0.5 $H_2O$: C, 39.6; H, 3.85; N, 15.35; P, 8.50%. Found: C, 39.88; H, 3.69, N, 15.26; P. 8.04%.

Step C: Preparation of N-4-sulfanilylphenyl phosphoric acid triamide

A solution of 880 mg. of N-4-(4-nitrophenylsulfonyl)phenyl phosphoric acid triamide in 30 ml. of ethanol was hydrogenated over Raney nickel catalyst at 40 p.s.i. at room temperature. After the theoretical quantity of hydrogen was taken up, the catalyst was removed by filtration. The filtrate was concentrated to dryness and the residue was crystallized from methanolether to give 690 mg. of N-4-sulfanilyphenyl phosphoric acid triamide.1 $H_2O$. The product, being a hydrate, did not have a discrete melting point.

Calc. for $C_{12}H_{15}N_4O_3Ps$. $H_2O$: C, 42.0; H, 4.9; N,

TABLE I

| Example | R | R | IV m.p. (C°) | Compound I m.p. (C°) | Empirical Formula | Calc/Found C | H | N |
|---|---|---|---|---|---|---|---|---|
| 2 | —CH₃ | —CH₃ | amorphous | 220 (dec.) | $C_{14}H_{19}N_4O_3PS·H_2O$ | 45.35 / 45.55 | 5.65 / 5.32 | 15.1 / 15.18 |
| 3 | —C₆H₅ | —C₆H₅ | amorphous | anhydrous 264–266 | $C_{24}H_{23}N_4O_3PS·1/2H_2O$ | 59.45 / 59.37 | 4.73 / 4.77 | 11.50 / 11.54 |
| 4 | —C₆H₁₁ | —C₆H₁₁ | amorphous | 160–190 (dec.) | $C_{24}H_{35}N_4O_3PS·1/2H_2O$ | 58.0 / 58.09 | 7.2 / 7.18 | 11.2 / 11.05 |
| 5 | —CH₂CH₂— | | 195–200 | 220–221 | $C_{14}H_{17}N_4O_3PS$ | 47.72 / 47.43 | 4.86 / 4.86 | 15.90 / 15.67 |
| 6 | cyclohexenyl | | 243(dec.) | 249–251 | $C_{18}H_{17}N_4O_3PS·H_2O$ | 51.7 / 51.74 | 4.55 / 4.71 | 13.35 / 12.96 |
| 7 | —CH₂CH(CH₃)— | | 132(dec.) | 237–238 | $C_{15}H_{19}N_4O_3PS·1/3H_2O$ | 48.5 / 48.92 | 5.13 / 4.99 | 15.00 / 14.77 |
| 8 | —CH₂C(O)—OC₂H₅ | —CH₂C(O)—OC₂H₅ | 162–165 | hemihydrate | $C_{20}H_{27}N_4O_7PS·1/2H_2O$ | 47.53 / 47.80 | 5.52 / 5.44 | 10.91 / 10.60 |
| 9 | —CH₂—C₆H₅ | —CH₂—C₆H₅ | 157–160 | hydrate | $C_{26}H_{27}N_4O_3PS·H_2O$ | 59.59 / 59.93 | 5.57 / 5.47 | 10.68 / 10.43 |
| 10 | adamantyl | adamantyl | 175(dec.) | Hemihydrate | $C_{32}H_{43}N_4O_3PS·1/2H_2O$ | 63.7 / 63.99 | 7.3 / 7.36 | 9.26 / 9.07 | fone and 500 ml. of phosphorus oxychloride was refluxed until solution was complete (about 1 hour). The hot solution was filtered to remove a small amount of insoluble material. The filtrate was cooled to room temperature. The precipitate was collected on a filter, washed with ether and dried to give 170 g. of 4-(4-nitrophenylsulfonyl)-phenyl phosphoramidic dichloride, m.p. 177°–179°C.

Calc. for $C_{12}H_9Cl_2N_2O_5PS$: C, 36.6; H, 2.30; N, 7.12; Cl, 17.80%. Found: C, 36.6; H, 2.34; N, 6.90; Cl, 16.88%.

Step B: Preparation of N-4-(4-nitrophenylsulfonyl)-phenyl phosphoric acid triamide Dioxane (25 ml.) was saturated with ammonia gas. To this ammoniacal dioxane was slowly added with stirring a solution of 500 mg. of the phosphoryl chloride from Step A in dioxane. Stirring was continued overnight. The precipitate was collected, washed with dioxane 16.3; P, 9.0%. Found: C, 43.44; H, 4.64; N, 16.13; P, 8.61%.

Employing substantially the procedure of Example 1, Steps B and C but substituting for the ammonia utilized in Step B, an equivalent amount of an amine of formula R—$NH_2$ described in Table I, there are produced the phosphoric acid triamides also described in Table I, in accordance with the following equation:

EXAMPLE 11

N'-(4-Sulfanilylphenyl)-N², N³-bis(2-diethylaminoethyl)phosphoric Acid Triamide

Step A: Preparation of N'-4-(4-nitrophenylsulfonyl)phenyl-N², N³-bis(2-diethylaminoethyl)phosphoric acid triamide A solution of 7.88 g. of 4-(4-nitrophenylsulfonyl) phenylphosphoramidic in 75 ml. of p-dioxane was added over 0.5 hour to a solution of 11.6 g. of N,N-diethylethylene diamine in 75 ml. of p-dioxane with stirring. After stirring overnight at ambient temperature, the solution was concentrated to a red oily residue. The oil was triturated well with water, and the water was decanted. The oily residue was dissolved in ethanol and evaporated to dryness to give 0.7 g. of amorphous product being a single component as determined by thin layer chromatography the structure of which was not contraindicated by nuclear magnetic resonance.

Step B: Preparation of N'-(4-Sulfonilylphenyl)-N², N³-bis (2-diethylaminoethyl)phosphoric acid triamide A solution of 6.7 g. of the nitro compound obtained in Step A in 100 ml. of ethanol was hydrogenated over Raney nickel catalyst and an initial hydrogen pressure of 45 p.s.i. The catalyst was separated on a filter and washed with warm methanol. The combined filtrate and washes were concentrated to a non-crystalline residue. The residue was chromatographed on a silica gel column in chloroform and eluted with methanol to give 3.9 g. of amorphous product the structure of which was not contraindicated by nuclear magnetic resonance.

Calc. for $C_{24}H_{41}N_6O_3PS \cdot 3/4CHCl_3$: C, 51.0; H, 7.35; N, 14.45%. Found: C, 50.87; H, 7.50; N, 14.34%.

EXAMPLE 12

N-4-Sulfanilyl-2-fluorophenylphosphoric acid triamide

Step A: Preparation of 4-nitro-3'-fluoro-4'-aminodiphenyl sulfone 2.75 G. of the compound 4-nitro-3'-fluoro-4'-acetamido-diphenyl sulfone is placed in 25 ml. of 6N hydrochloric acid and refluxed for two hours. Upon cooling, the hydrochloride salt precipitates. The mixture is diluted with water and brought to pH 10 using sodium hydroxide solution. the precipitate is collected and washed with water to give 2.2 g. of product, 4-nitro-3'-fluoro-4'-amino-diphenyl sulfone, m.p. 150°–153°C. The product is used directly in the next step without further characterization.

Employing the procedure of Example 1, Steps A through C, but substituting for the 4-amino-4'-nitrodiphenyl sulfone used in Step A of Example 1, an equivalent amount of 4-nitro-3'-fluoro-4'-aminodiphenyl sulfone, there is produced in sequence:

Step B: 4-(4-nitrophenylsulfonyl)-2-fluorophenylphosphoramidic dichloride.
Step C: N-4-(4-nitrophenylsulfonyl)-2-fluorophenylphosphoric acid triamide.
Step D: N-4-Sulfanilyl-2-fluorophenylphosphoric acid triamide.

Employing the procedure of Examples 1 and 12 but substituting for the ammonia utilized in Steps B of Example 1 and Step C of Example 12, an equivalent amount of the amines described in Table II, there are produced the phosphoric acid triamides also described in Table II, in accordance with the following equation:

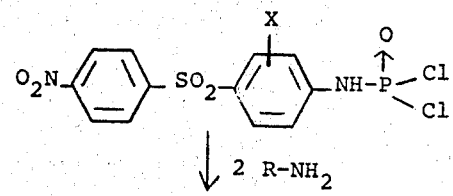

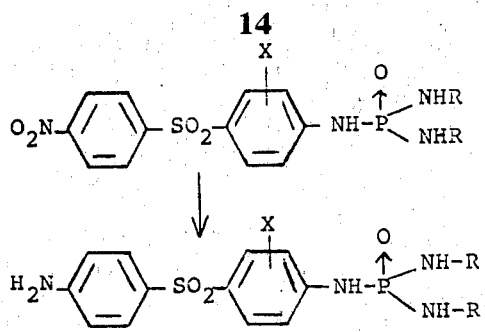

TABLE II

| Example | X | R | R |
|---|---|---|---|
| 13 | F | —CH₃ | —CH₃ |
| 14 | F | —Ph | —Ph |
| 15 | F | —cyclohexyl | —cyclohexyl |
| 16 | F | —CH₂—CH₂— | |
| 17 | F | —CH₂Ph | |
| 18 | F | —CH₂—CH(CH₃)— | |
| 19 | F | —CH₂C(O)—OC₂H₅ | —CH₂—C(O)—OC₂H₅ |
| 20 | F | —CH₂—Ph | —CH₂—Ph |
| 21 | F | —norbornyl | —norbornyl |
| 22 | H | —CH₂CH₂CH₃ | —CH₂CH₂CH₃ |
| 23 | H | —Ph-Cl | —Ph-Cl |
| 24 | H | —Ph-CH₃ | —Ph-CH₃ |
| 25 | H | —Ph-OCH₃ | —Ph-OCH₃ |
| 26 | H | —cyclopropyl | —cyclopropyl |
| 27 | H | —CH₂CH₂CH₂— | |
| 28 | H | —Ph(Cl) | |
| 29 | H | —Ph(CH₃) | |
| 30 | H | —Ph(OCH₃) | |
| 31 | H | —CH₂—Ph—Cl | —CH₂—Ph—Cl |
| 32 | H | —CH₂—Ph—CH₃ | —CH₂—Ph—CH₃ |
| 33 | H | —CH₂—Ph—OCH₃ | —CH₂—Ph—OCH₃ |

EXAMPLE 34

N'-(4-N-furfurylidenesulfanilyl)phenyl-N², N³-dimethyl phosphoric acid triamide 1.5 G. of furfural is dissolved in 50 ml. of ethanol and 2.56 g. of N'-(4-sulfanilylphenyl)-N², N³-dimethyl phosphoric acid triamide. The solution is concentrated to a volume of 15 ml., then cooled. A precipitate forms during the concentration and is collected and washed with ethanol. Recrystallization of the solid from 40 ml. of methanol yields the product N'-(4N-furfurylidenesulfanilyl)phenyl-$N^2,N^3$-dimethyl phosphoric acid triamide.

Employing the procedure of Example 34, but substituting for the furfural and the N'-(4-sulfanilyl)-$N^2,N^3$-dimethyl phosphoric acid triamide used therein, equivalent amounts of an aldehyde of formula $R_4CHO$ and a N-(4-sulfanilylphenyl) phosphoric acid triamide of formula:

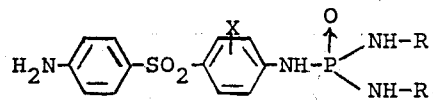

respectively, which are described in Table III, there are produced the Schiff bases also described in Table IIi in accordance with the following equation:

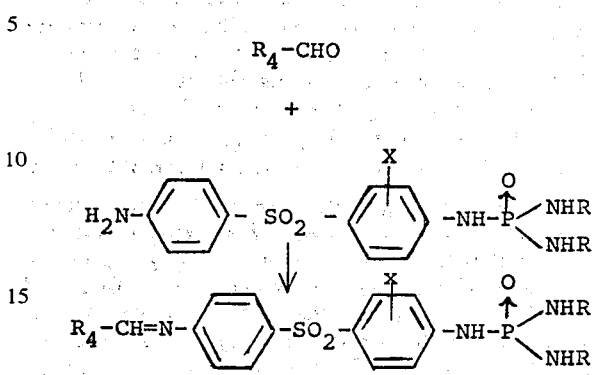

TABLE III

| Example | $R_4$ | X | R | R |
|---|---|---|---|---|
| 35 | thiophene | H | H | H |
| 36 | thiophene | F | H | H |
| 37 | pyrrole (NH) | H | phenyl | phenyl |
| 38 | pyrrole (NH) | F | phenyl | phenyl |
| 39 | pyridine | H | phenyl | phenyl |
| 40 | pyridine | F | phenyl | phenyl |
| 41 | pyran (O) | | H | —CH$_2$CH$_2$— |
| 42 | pyran (O) | | F | —CH$_2$CH$_2$— |
| 43 | phenyl | | H | phenyl |
| 44 | phenyl | | F | phenyl |
| 45 | 3-CH$_3$O, 2-OH phenyl | | H | —CH$_2$—CH(CH$_3$)— |
| 46 | 3-CH$_3$O, 2-OH phenyl | | F | —CH$_2$—CH(CH$_3$)— |
| 47 | Cl, OH phenyl | | H | —CH$_2$C(O)—OC$_2$H$_5$ | —CH$_2$C(O)—C$_2$H$_5$ |
| 48 | Cl, OH phenyl | | F | —CH$_2$C(O)—OC$_2$H$_5$ | —CH$_2$C(O)—OC$_2$H$_5$ |
| 49 | Cl-phenyl | | H | phenyl-CH$_2$— | phenyl-CH$_2$— |
| 50 | Cl-phenyl | | F | phenyl-CH$_2$— | phenyl-CH$_2$— |

TABLE III-continued

| Example | R₄ | X | R | R |
|---|---|---|---|---|
| 51 | 3,4-methylenedioxyphenyl | H | 2-adamantyl | 1-adamantyl |
| 52 | 3,4-methylenedioxyphenyl | F | 2-adamantyl | 2-adamantyl |
| 53 | 4-chlorophenyl | H | $CH_3-$ | $CH_3-$ |
| 54 | 4-chlorophenyl | F | $CH_3-$ | $CH_3-$ |
| 55 | 4-hydroxy-3-methoxyphenyl | H | H | H |
| 56 | 4-hydroxy-3-methoxyphenyl | F | H | H |
| 57 | 3-chloro-4-hydroxyphenyl | H | $-(CH_2)_2N(C_2H_5)_2$ | $-(CH_2)_2N(C_2H_5)_2$ |
| 58 | 3-chloro-4-hydroxyphenyl | F | $-(CH_2)_2N(C_2H_5)_2$ | $-(CH_2)_2N(C_2H_5)_2$ |
| 59 | phenyl-CH=CH- | H | H | H |

EXAMPLE 60 p-Phthalylidene-bis[N-(4-sulfanilylphenyl)-phosphoric acid triamide]

To a solution of 20 millimoles of N-(4-sulfanilylphenyl)phosphoric acid triamide in 50 ml. of hot methanol is added slowly with stirring a solution of 10 millimoles of p-phthalaldehyde in 50 ml. of hot methanol. The mixture is cooled and the precipitate of p-phthalylidene-bis[N-(4-sulfanilylphenyl)phosphoric acid triamide] is collected.

EXAMPLE 61

N-[4-(4-trifluoroacetamidophenylsulfonyl)phenyl]-phorphoric acid triamide

A suspension of 10 moles of N-(4-sulfanilylphenyl)-phosphoric acid triamide in 20 ml. of trifluoroacetic anhydride is stirred overnight at room temperature. The precipitated solid is removed by filtration at the end of the reaction, washed with ether, and recrystallized from methanol-water to give the product N-[4-(4-trifluoroacetamidophenylsulfonyl)phenyl]phosphoric acid triamide.

EXAMPLE 62

N'-[4-(N-chloroacetylsulfanilyl)phenyl]-N²,N³-dimethyl phosphoric acid triamide

To a suspension of 14.1 g. of N'-(4-sulfanilylphenyl-N²,N³-dimethyl phosphoric acid triamide in 200 ml. of water containing 2 g. of sodium hydroxide, is added 25 ml. of chloroacetylchloride. The reaction mixture is stirred at room temperature for one hour at which time thin layer chromatography shows no presence of the starting material. The product is recovered from the reaction mixture by filtration and purified by recrystallization from methanol-water to give N'-[4-(N-chloroacetylsulfanilyl)phenyl]N²,N³-dimethyl phosphoric acid triamide.

EXAMPLE 63

N'-[4-(N-cyclohexanoylsulfanilyl)phenyl]-N²,N³-diphenyl phosphoric acid triamide To a warm solution of 0.01 mole of N'-(4-sulfanilylphenyl)-N²,N³-diphenyl phosphoric acid triamide in 10 ml. of pyridine is added 1.11 g. of cyclohexanecarbonyl chloride. The mixture is heated on a steam bath for 15 hours and an additional 1.1 g. of the acid chloride is added. After 5 more minutes of warming, the mixture is cooled and diluted with 140 ml. of water. A viscous oil is separated. The supernatant is decanted and replaced with more water. After stirring overnight, the oil is solidified and is collected on a filter. The solid is dissolved in 100 ml. of acetone, the solution is filtered to remove insolubles, and concentrated to 50 ml. The solution is then cooled. The precipitate of N'-[4-(N-cyclohexanoylsulfanilyl)phenyl]-N²,N³-diphenyl phosphoric acid triamide is collected and dried.

Employing the procedure of Example 63, but substituting for the cyclohexanecarbonylchloride and the N'-(4-sulfanilylphenyl)-N²,N³-diphenyl phosphoric acid triamide used therein, equivalent amounts of the acid chlorides of structure R₃—COCl and the phosphoric acid triamides, respectively, described in Table IV, there are produced the N-acyl compounds also described in Table IV, in accordance with the following equation:

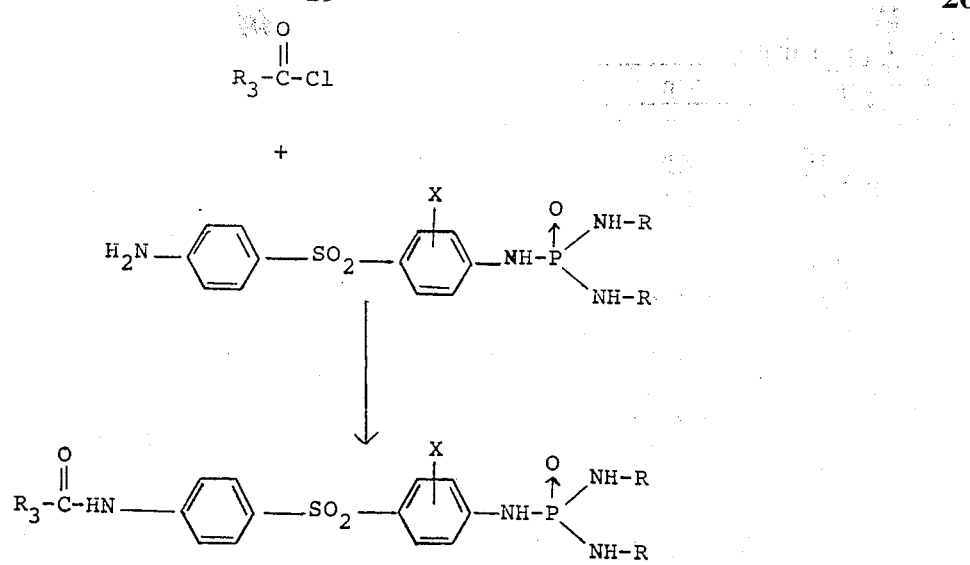
TABLE IV
| Example | R₃ | X | R | R |
|---|---|---|---|---|
| 64 | cyclobutyl | H | —CH₂—CH₂— | |
| 65 | cyclobutyl | F | —CH₂—C(=O)—OC₂H₅— | —CH₂—C(=O)—OC₂H₅— |
| 66 | furyl | H | cyclohexyl | cyclohexyl |
| 67 | furyl | F | phenyl | |
| 68 | pyridyl | H | —CH₂—CH(CH₃)— | |
| 69 | pyridyl | F | —CH₂—phenyl | —CH₂—phenyl |
| 70 | pyrrolyl | H | cycloheptyl | cycloheptyl |
| 71 | pyrrolyl | F | H | H |
| 72 | pyrrolidinyl | F | —CH₃ | —CH₃ |
| 73 | pyrrolidinyl | H | phenyl | phenyl |
| 74 | CH₃— | H | H | H |

EXAMPLE 75

N'-[4-(N-glycylsulfanilyl)phenyl]-N$^2$,N$^3$-Dimethyl Phosphoric Acid Triamide

The amide prepared in Example 62, N'-[4-N-chloroacetylsulfanilyl)penyl]-N$^2$,N$^3$-dimethyl phosphoric acid triamide, (5 g.) is dissolved in 250 ml. of concentrated ammonium hydroxide and 250 ml. of ethanol and heated at reflux for 2–5 hours. The ethanol is evaporated under reduced pressure. The resulting precipitate is collected on a filter and washed well with water and dried to give N'-[4-(N-glycylsulfanilyl)-phenyl]-N$^2$,N$^3$-dimethyl phosphoric acid triamide.

EXAMPLE 76

N-[4-(N-phenylalanylsulfanilyl)phenyl]phosphoric Acid Triamide

To 3.26 g. of N-4-(sulfanilyl)phenyl phosphoric triamide acid dissolved in 20 ml. of dry pyridine is added with stirring 3.2 g. of phthalyl-L-phenylalanylchloride [J.A.C.S. 74, 38-2 (1952)]. A crystalline product begins to form after a few minutes. After a few hours, water is added to complete crystallization. The crude product is collected on a filter and washed well with water to yield N-[4-(N-phthalyl-L-phenylalanylsulfanilyl)phenyl]phosphoric acid triamide.

A mixture of 0.002 mole of N-[4-(phthalyl-L-phenylalanylsulfanilyl)phenyl]phosphoric acid triamide and 0.15 g. (0.003 mole) of hydrazine hydrate in 20 ml. of ethanol is heated at reflux temperature for 3 hours. The reaction mixture is concentrated under reduced pressure to leave a solid residue. It is then extracted with 10% potassium hydroxide solution to remove phthalylhydrazide, a by-product of the reaction. The alkali-insoluble material is washed with water and ethanol and dried to give N-[4-(N-phenylalanylsulfanilyl)phenyl]phosphoric acid triamide.

EXAMPLE 77

N'-[4-(N-succinylsulfanilyl)phenyl]-N$^2$,N$^3$-dimethyl Phosphoric Acid Triamide A mixture of 0.011 mole of N'-(4-sulfanilyl)phenyl-N$^2$,N$^3$-dimethyl phosphoric acid triamide, 1.0 g. of succinic anhydride and 60 ml. of methyl ethyl ketone is heated at reflux for 17 hours. After cooling, the crystalline product is collected on a filter, washed with methyl ethyl ketone and air dried to give N'-[4-(N-succinylsulfanilyl)phenyl]-N$^2$,N$^3$-dimethyl phosphoric acid triamide.

EXAMPLE 78

N'-[4-(N-dimethylaminomethylenesulfanilyl)phenyl]-N$^2$, N$^3$-Dimethyl Phosphoric Acid Triamide To 20 ml. of dry dimethylformamide in an ice bath is added 2.56 ml. of phosphorous oxychloride during five minutes. To the resulting solution is added 0.015 g. of N'-(4-sulfanilyl)phenyl-N$^2$,N$^3$-dimethyl phosphoric acid triamide which dissolves immediately. A precipitate subsequently forms and after two hours at room temperature, the solid is removed by filtration and washed with dimethylformamide and with ether. This solid is taken up in 100 ml. of cold water, the solution filtered, and the filtrate brought to pH 8 with aqueous sodium hydroxide. The product is filtered, washed with water, and dried in vacuo to give N'-[4-(N-dimethylaminomethylenesulfanilyl) phenyl]-N$^2$,N$^3$-dimethyl phosphoric acid triamide.

EXAMPLE 79

A mixture of 250 parts of N'-(4-sulfanilylphenyl)-N'-N''-phenylene phosphoric acid triamide and 25 parts of lactose is granulated with suitable water, and to this is added 100 parts of maize starch. The mass is passed through a 16 mesh screen. The granules are dried at a temperature below 60°C. The dry granules are passed through a 16 mesh screen, and mixed with 3.8 parts of magnesium stearate. They are then compressed into tablets suitable for oral administration.

The specific phosphoric triamide used in the foregoing example may be replaced by 25, 100, 250, or 500 parts of other phosphoric triamides of this invention to produce tablets suitable for oral administration as an anti-inflammatory, anti-pyretic and/or analgesic according to the method of this invention.

EXAMPLE 80

A mixture of 50 parts of N-(4-sulfanilylphenyl)-N',N''-bis(ethoxycarbonylmethyl)phosphoric acid triamide, 3 parts of the calcium salt of lignin sulphonic acid, and 237 parts of water is ball-milled until the size of substantially all of the particles is less than 10 microns. The suspension is diluted with a solution containing 3 parts of sodium carboxymethylcellulose and 0.9 parts of the butyl ester of p-hydroxybenzoic acid in 300 parts of water. There is thus obtained an aqueous suspension suitable for oral administration for therapeutic purposes.

EXAMPLE 81

A mixture of 250 parts of N-(4-sulfanilylphenyl)-N',N''-bis(cyclohexyl)phosphoric acid triamide, 200 parts of maize starch and 30 parts of alginic acid is mixed with a sufficient quantity of 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 82

A mixture of 500 parts N-(4-sulfanilylphenyl)-N',N''-phenylene phosphoric acid triamide, 60 parts maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

EXAMPLE 83

1. Tablets. — 10,000 scored tablets for oral use, each containing 500 mg. of active ingredient are prepared from the following ingredients:

|  | Gm. |
|---|---|
| N-(4-sulfanilylphenyl)-N',N''-bis-ethoxycarbonylmethyl) phosphoric acid triamide | 5000 |
| Starch, U.S.P. | 350 |
| Talc, U.S.P. | 250 |
|  | Gm. |
| Calcium stearate | 35 |

The powdered phosphoric triamide is granulated with a 4% w./v. aqueous solution of methylcellulose U.S.P. (1500 cps.). To the dried granules is added a mixture of the remainder of the ingredients and the final mixture compressed into tablets of proper weight.

2. Capsules. — 10,000 two-piece hard gelatine capsules for oral use, each containing 250 mg. of phosphoric acid triamide are prepared from the following ingredients:

|  | Gm. |
|---|---|
| N-(4-sulfinilylphenyl)-N',N''-bis-(cyclohexyl)phosphoric triamide | 2500 |
| Lactose, U.S.P. | 1000 |
| Starch, U.S.P. | 300 |
| Talc, U.S.P. | 65 |
| Calcium stearate | 25 |

The powdered phosphoric acid triamide is mixed with the starch-lactose mixture followed by the talc and calcium stearate. The final mixture is then encapsulated in the usual manner. Capsules containing 10, 25, 50 and 100 mg. of phosphoric acid triamide are also prepared by substituting 100, 250, 500 and 1,000 gm. for 2,500 gm. in the above formulation.

3. Soft elastic capsules. — One-piece soft elastic capsules for oral use, each containing 200 mg. of phosphoric acid triamide are prepared in the usual manner by first dispersing the powdered active material in sufficient corn oil to render the material capsulatable.

4. Aqueous suspension. — An aqueous suspension for oral use containing in each 5 ml., 1 gram of phosphoric acid triamide is prepared from the following ingredients:

|  | Gm. |
|---|---|
| N-(4-sulfanilylphenyl)-N',N''-phenylene phosphoric acid triamide | 2000 |
| Methylparaben, U.S.P. | 7.5 |
| Propylparaben, U.S.P. | 2.5 |
| Saccharin sodium | 12.5 |
| Glycerin | 3000 |
| Gragacanth powder | 10 |
| Orange oil flavor | 10 |
| F. D. and C. orange dye | 7.5 |
| Deionized water, q.s. to 10,000 mg. | |

What is claimed is:

1. A compound of structural formula:

[structural formula]

wherein
X is hydrogen or fluoro;
R is
   a. lower alkyl,
   b. phenyl-lower alkyl,
   c. halophenyl-lower alkyl,
   d. lower alkylphenyl-lower alkyl,
   e. lower alkoxyphenyl-lower alkyl,
   f. lower cycloalkyl,
   g. phenyl,
   h. halophenyl,
   i. lower alkylphenyl,
   j. lower alkoxyphenyl,
   k. lower alkoxycarbonyl-lower alkyl,
   l. di(lower alkyl)amino-lower alkyl,
   m. adamantanyl;
$R_1$ is hydrogen;
$R_2$ is hydrogen or $$R_3-\overset{\overset{O}{\|}}{C}-,$$

wherein $R_3$ is
   a. lower alkyl,
   b. halo-lower alkyl,
   c. amino-lower alkyl,
   d. phenyl-lower alkyl,
   e. carboxy-lower alkyl,
   f. lower cycloalkyl,
   g. a 5–6 membered heterocycle wherein the hetero atom is oxygen or nitrogen selected from furyl, pyridyl, imidazolyl, and imidazolidinyl.

2. The compound of claim 1, wherein $R_1$ and $R_2$ are hydrogen.

3. The compound of claim 2 of formula:

$$H_2N-\phenyl-SO_2-\phenyl-NH-\overset{O}{\underset{\|}{P}}(NH-CH_3)_2$$

4. The compound of claim 2 of formula:

$$H_2N-\phenyl-SO_2-\phenyl-NH-\overset{O}{\underset{\|}{P}}(NH-C_6H_{11})_2$$

5. The compound of claim 2 of formula:

$$H_2N-\phenyl-SO_2-\phenyl-NH-\overset{O}{\underset{\|}{P}}(NH-CH_2\overset{O}{\underset{\|}{C}}OC_2H_5)_2$$

6. The compound of claim 2 of formula:

$$H_2N-\phenyl-SO_2-\phenyl-NH-\overset{O}{\underset{\|}{P}}(NH-CH_2CH_2N(C_2H_5)_2)_2$$

* * * * *